United States Patent
Cai et al.

(10) Patent No.: US 7,065,875 B2
(45) Date of Patent: Jun. 27, 2006

(54) BUSHING SUPPORT RING FOR STABILIZER BAR

(75) Inventors: Haimian Cai, Ann Arbor, MI (US); Xinjian Fan, Plymouth, MI (US); Mikhal El Arculli, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 323 days.

(21) Appl. No.: 10/721,651

(22) Filed: Nov. 25, 2003

(65) Prior Publication Data

US 2005/0110234 A1  May 26, 2005

(51) Int. Cl.
*B21D 53/88* (2006.01)
(52) U.S. Cl. .......................... 29/897.2; 29/517; 219/58; 219/61.2; 219/156; 280/124.107
(58) Field of Classification Search .................. 29/517, 29/897.2; 280/124.107; 219/56, 56.22, 219/58, 61.2, 156; 267/188, 189
See application file for complete search history.

(56) References Cited

U.S. PATENT DOCUMENTS

| | | | |
|---|---|---|---|
| 2,275,637 A * | 3/1942 | Boor et al. | ................. 267/189 |
| 2,972,489 A | 2/1961 | Collier et al. | |
| 3,104,097 A | 9/1963 | Kozicki | |
| 3,140,378 A | 7/1964 | Benninghoff | |
| 3,366,356 A * | 1/1968 | Fisher | ......................... 248/56 |
| 4,818,166 A * | 4/1989 | Szukay et al. | .............. 411/361 |
| 5,013,166 A * | 5/1991 | Domer | ....................... 384/220 |
| 5,352,055 A | 10/1994 | Hellon et al. | |
| 5,507,518 A * | 4/1996 | Nakahara et al. | ..... 280/124.166 |
| 5,630,609 A | 5/1997 | Shin | |
| 5,857,800 A | 1/1999 | Nell | |
| 6,123,352 A | 9/2000 | Muzio | |
| 6,255,631 B1 | 7/2001 | Kichline, Jr. et al. | |
| 6,685,381 B1 * | 2/2004 | Sugita et al. | ................ 403/341 |
| 2002/0121733 A1 | 9/2002 | Lewis et al. | |
| 2002/0149167 A1 | 10/2002 | Wiesemann et al. | |
| 2005/0029723 A1 * | 2/2005 | Lewis et al. | ................ 267/189 |
| 2005/0077663 A1 * | 4/2005 | Owen et al. | ................ 267/188 |
| 2005/0180812 A1 * | 8/2005 | Torongo | ..................... 403/282 |

* cited by examiner

*Primary Examiner*—David P. Bryant

(57) ABSTRACT

A stabilizer bar assembly for an automotive vehicle includes a stabilizer bar, a bushing mounted to the stabilizer bar, and a support ring mounted onto the stabilizer bar adjacent the bushing to provide a stop to prevent the bushing from moving axially along the stabilizer bar. The support ring has a plurality of inwardly extending projections. Each of the inwardly extending projections has a distal end in contact with an outer surface of the stabilizer bar. The distal ends of the inwardly extending projections are welded to the outer surface of the stabilizer bar to secure the support ring onto the stabilizer bar.

4 Claims, 5 Drawing Sheets

BUSHING SUPPORT RING FOR STABILIZER BAR

BACKGROUND OF INVENTION

1. Technical Field of the Invention

The present invention generally relates to a stabilizer bar for an automotive vehicle. More specifically, the present invention relates to a stabilizer bar having a bushing support mounted thereon to prevent the bushing from moving axially along the stabilizer bar.

2. Description of the Prior Art

In an automotive vehicle, a stabilizer bar helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide limited torsional, axial and radial movement of the stabilizer bar relative to the bracket. The rubber bushings also dampen the movement of the stabilizer bar. Accordingly, the stiffness, or spring rate, of the bushings affects the feel of the suspension of the vehicle.

To keep the bushings positioned on the stabilizer bar, a stop is usually formed within, or mounted onto, the stabilizer bar. Sometimes the stops are provided as an annular rib, or ribs, extending around the stabilizer bar. This makes the stabilizer bar more difficult to manufacture and adds weight to the stabilizer bar. Alternatively, the bushings can be secured in position on the stabilizer bar by using a chemical bonding agent. This, again, adds cost and complexity to the manufacturing process.

As seen from the above, there is a need for an improved stabilizer bar assembly which uses a lightweight, inexpensive ring that is attached to the stabilizer bar to prevent axial movement of the bushing relative to the stabilizer bar.

SUMMARY OF THE INVENTION

The disadvantages of the prior art are overcome by providing a stabilizer bar assembly, in accordance with the present invention, in which the stabilizer bar assembly includes a stabilizer bar having a bushing mounted thereon. The assembly further includes a support ring that is attached to the stabilizer bar through electrical resistance welding.

In a first aspect of the present invention the support ring has a plurality of inwardly extending projections, each having a distal end that is welded to an outer surface of the stabilizer bar.

In another aspect of the invention, the support ring is a single piece having the inwardly extending projections are spaced about the support ring such that the distal ends of the inwardly extending projections contact the outer surface of the stabilizer bar at spaced apart locations circumferentially about the stabilizer bar.

Still another aspect of the present invention, the support ring comprises a plurality of portions that each includes a plurality of inwardly extending projections having distal ends that are welded onto an outer surface of the stabilizer bar.

DETAILED DESCRIPTION OF THE PREFERRED EMBODIMENTS

Figure 1:
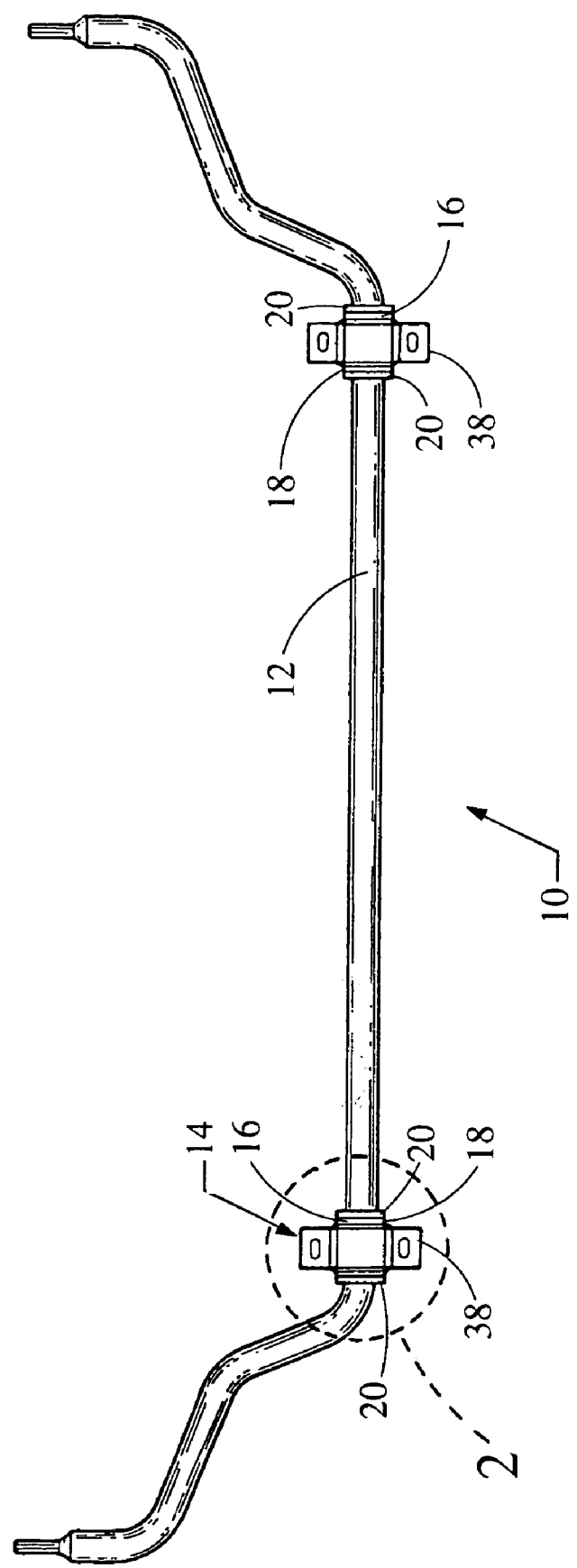
FIG. 1 is a plan view of a stabilizer bar of the present invention.
Figure 2:
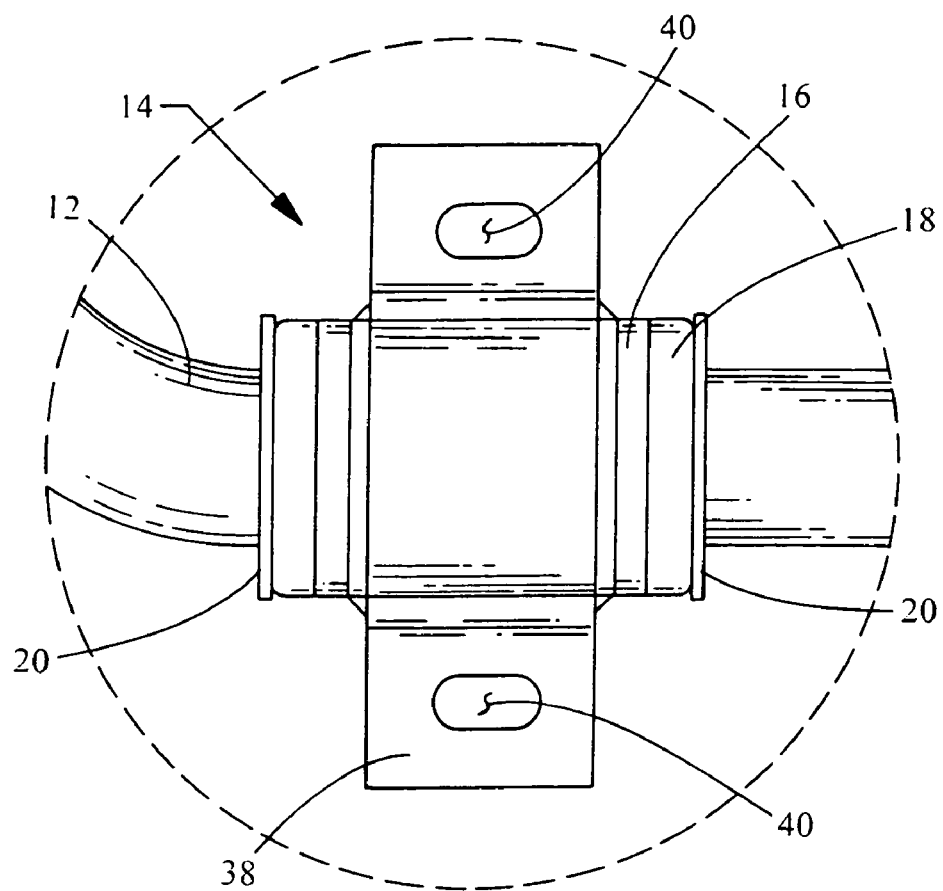
FIG. 2 is an enlarged view of the portion of the stabilizer bar shown in FIG. 1 enclosed by the circle numbered 2.

Referring to FIGS. 1 and 2, a stabilizer bar assembly for an automotive vehicle is shown generally at 10. The stabilizer bar assembly 10 includes a stabilizer bar 12 with at least one bushing assembly 14 mounted thereon. The stabilizer bar 12 is generally made from steel, and can be solid or hollow. It is to be understood, that the stabilizer bar 12 can be made from other suitable materials. The bushing assemblies 14 include a bushing retainer 16 that encompasses a bushing 18 and is in mechanical compressive engagement with the bushing 18 such that the bushing 18 is frictionally engaged with the stabilizer bar 12.

The bushing 18 is made from an elastomeric material, such as rubber, or some other resilient material. The bushing 18 is generally sleeve shaped having an cylindrical outer surface and a round passage extending therethrough defining an inner diameter. Preferably, the inner diameter of the bushing 18 is slightly smaller than an outer diameter of the stabilizer bar 12, however it is to be understood that the present invention can be practiced with a bushing 18 having an inner diameter that is equal to or slightly larger than the outer diameter of the stabilizer bar 12.

Preferably, the bushing 18 is held onto the stabilizer bar 12 by friction, however, an adhesive can also be applied between the inner diameter of the bushing 18 and the stabilizer bar 12 to provide additional retention of the bushing 18 on the stabilizer bar 12. Once the bushing 18 is properly located on the stabilizer bar 12, the bushing retainer 16 is positioned about the bushing 18. The bushing retainer 16 is generally sleeve shaped having an inner diameter large enough to accommodate the bushing 18. It is to be understood, that the present invention can be practiced with other types of bushings, particularly with bushings that do not include an adhesive or a bushing retainer.

The stabilizer bar 12 also includes support rings 20 mounted thereon. The support rings 20 are adapted to prevent the bushing 18 from moving axially along the stabilizer bar. Referring to FIG. 2, preferably, a support ring 20 is mounted adjacent the bushing 18 on either side of the bushing 18 to prevent the bushing 18 from moving axially in either directions along the stabilizer bar 12. Alternatively, the stabilizer bar 12 could include only one support ring 20 positioned adjacent the bushing 18 on one side to prevent movement of the bushing in only one direction.

Figure 3:
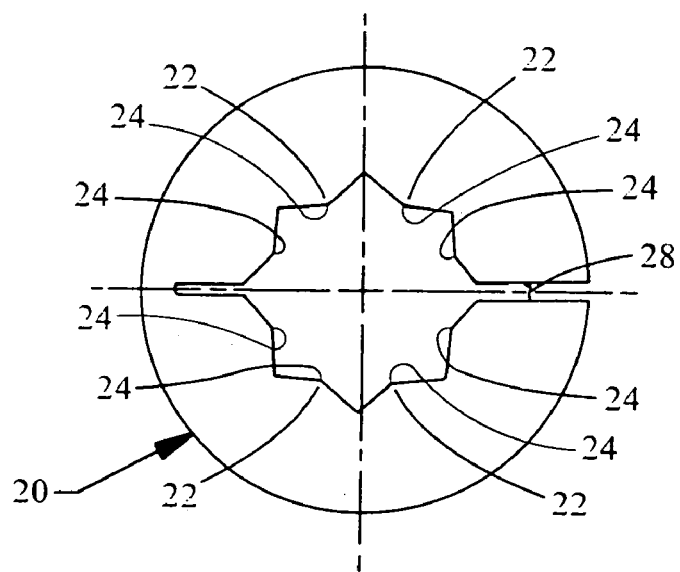
FIG. 3 is a plan view of a first embodiment of a support ring of the stabilizer bar shown in FIGS. 1 and 2.

Referring to FIG. 3, in a first embodiment of the support ring 20, the support ring 20 is a single piece stamping. It is to be understood that the single piece support ring 20 could be manufactured by other suitable methods. The support ring 20, as shown, is generally circular ring shaped and has a plurality of inwardly extending projections 22 formed therein. Each of the inwardly extending projections 22 includes a distal end 24. The distal ends 24 of the inwardly extending projections 22 are welded onto an outer surface 26 of the stabilizer bar. Preferably, the distal ends 24 of the inwardly extending projections 22 are welded by electrical resistance welding, however, it is to be understood that other appropriate welding techniques can be used.

Figure 4:
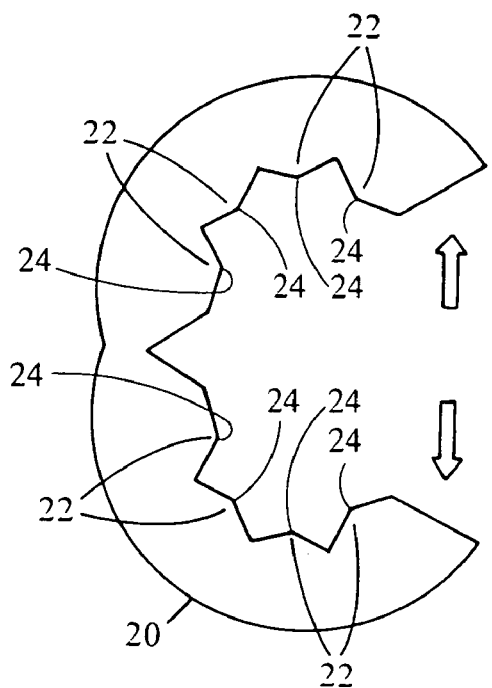
FIGS. 4–7 are figures illustrating how the support ring shown in FIG. 3 is opened, placed onto the stabilizer bar, and welded in place.
Figure 5:
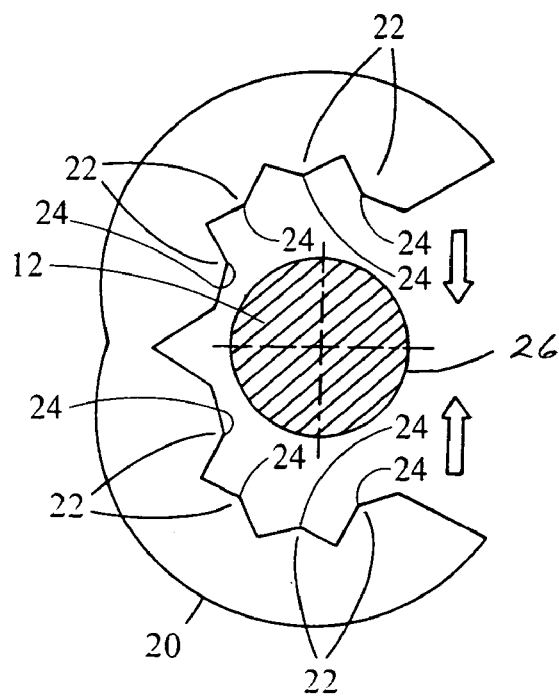
Figure 6:
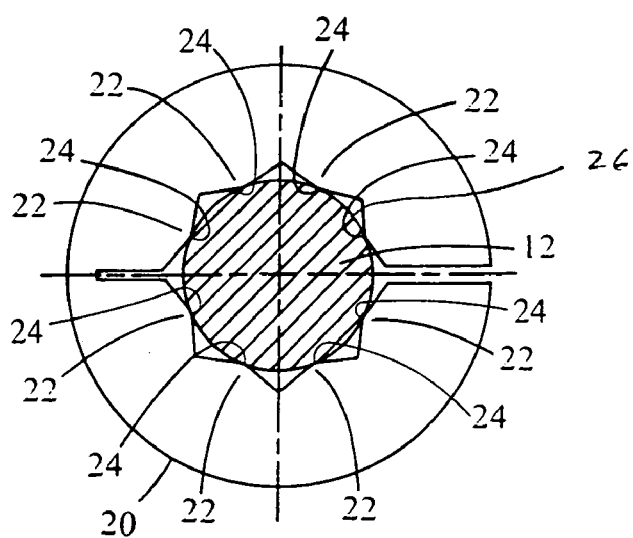

Referring to FIGS. 4–7, the support ring 20 is placed onto the stabilizer bar 12 and welded in place. The support ring 20 is formed as a single piece having a generally circular ring shape. An opening 28 is formed within the support ring 20 to allow the support ring 20 to be opened up as shown in FIG. 4. Alternatively, the support ring 20 can be formed in the open position as shown in FIG. 4. Once the support ring 20 is opened up such that the stabilizer bar can fit within the opening 28, then the support ring 20 is forced back to a closed position around the stabilizer bar 12, as shown in FIG. 5. The support ring 20 is closed to a point where the distal ends 24 of the inwardly extending projections 22 are in contact with the outer surface 26 of the stabilizer bar, as shown in FIG. 6.

Figure 7:
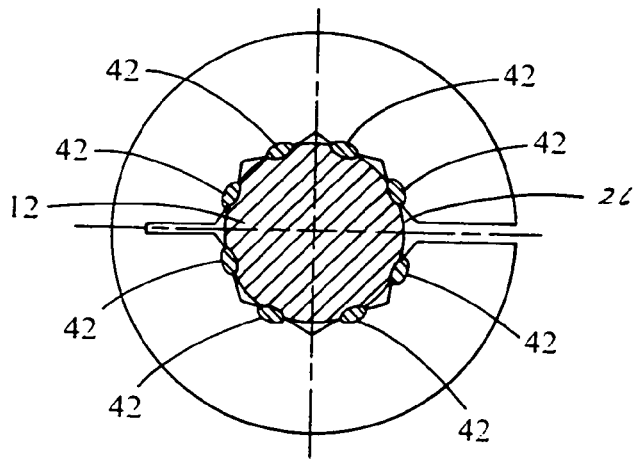

After the support ring 20 has been placed onto the stabilizer bar 12, radial pressure is exerted onto the support ring 20 to keep the distal ends 24 of the inwardly extending projections 22 in solid contact with the outer surface 26 of the stabilizer bar. While under pressure, an electric current is passed through the support ring 20 and the stabilizer bar 12 in order to form welds 42 between the distal ends 24 of the inwardly extending projections 22 and the outer surface 26 of the stabilizer bar 12 by electrical resistance welding, as shown in FIG. 7. The inwardly extending projections 22 are spaced about the support ring 20 such that the distal ends 24 of the inwardly extending projections 22 contact the outer surface 26 of the stabilizer bar 12 at spaced apart locations circumferentially about the stabilizer bar 12.

Figure 8:
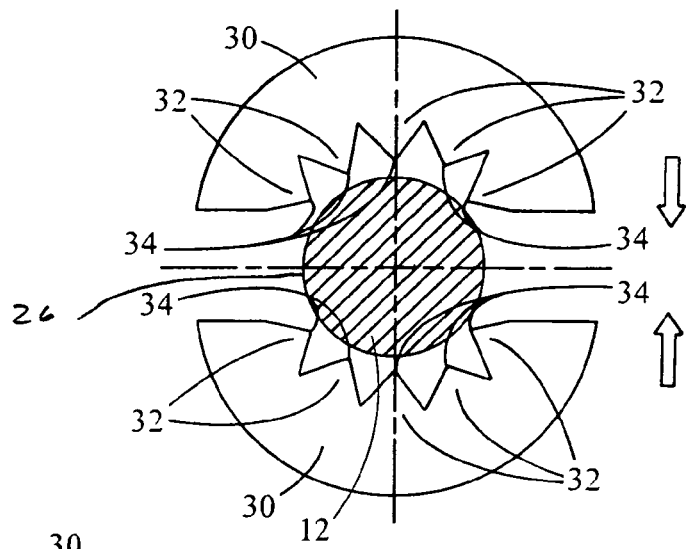
FIGS. 8–10 are figures illustrating how a second embodiment of the support ring is placed onto the stabilizer bar and welded in place.
Figure 9:
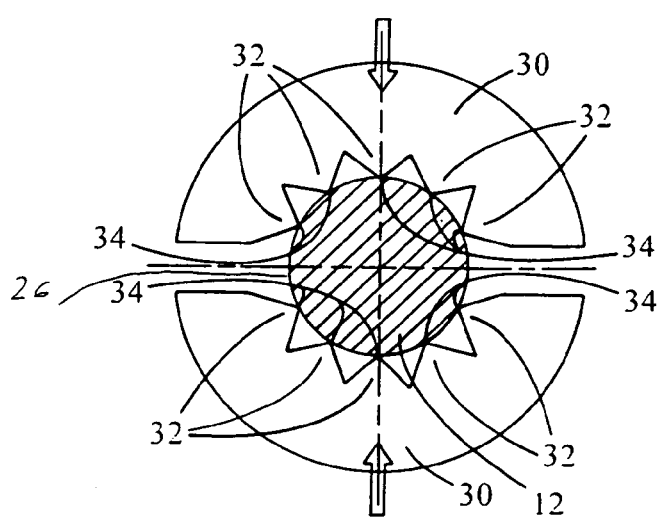
Figure 10:
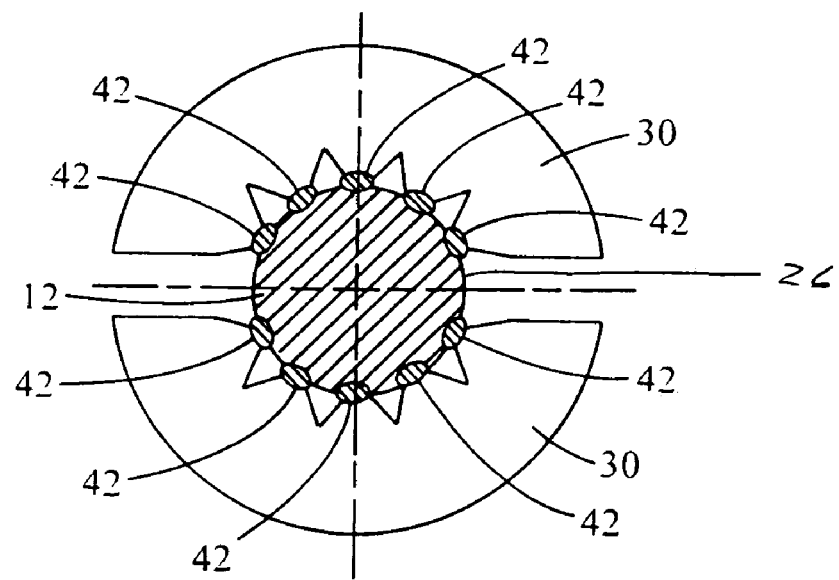
Figure 11:
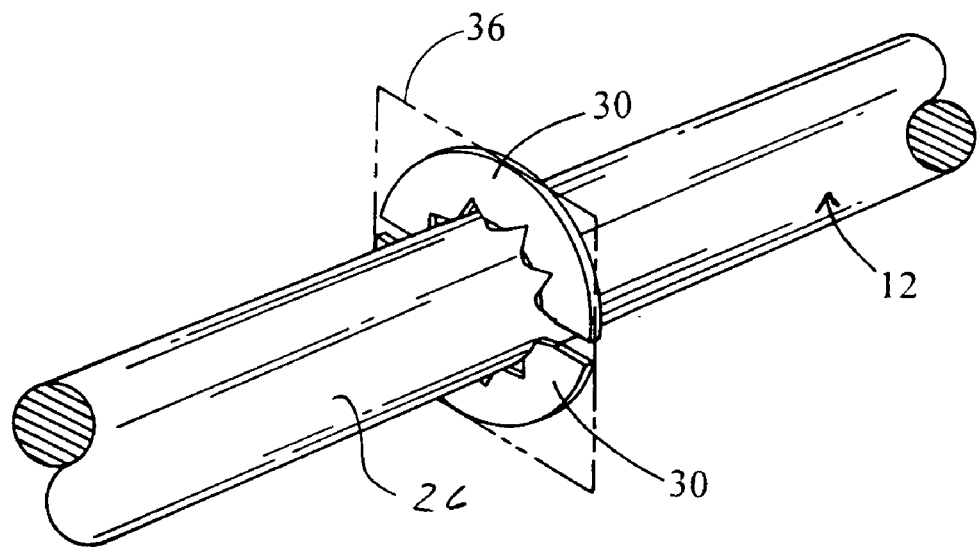

Referring to FIGS. 8–10, a second embodiment of the support ring 20 comprises a plurality of generally semi-circular portions 30. Each of the portions 30 has a plurality of inwardly extending projections 32 having distal ends 34 that are welded onto the outer surface 26 of the stabilizer bar 12. The portions 30 are spaced circumferentially about the stabilizer bar 12. Preferably, the portions 30 are mounted to the stabilizer bar 12 such that each of the portions 30 are aligned with one another in such a way that the portions 30 cooperate to provide support for the bushing 18 around the stabilizer bar 12, as shown in FIG. 11.

When mounting the portions 30 onto the stabilizer bar, the portions are placed circumferentially about the stabilizer bar 12 such that the distal ends 34 of the inwardly extending projections 32 are in contact with the outer surface 26 of the stabilizer bar 12, as shown in FIGS. 8 and 9. After the portions 30 have been placed onto the stabilizer bar 12, radial pressure is exerted onto the portions 30 to keep the distal ends 34 of the inwardly extending projections 32 in solid contact with the outer surface 26 of the stabilizer bar 12.

While under pressure, an electric current is passed through the support ring 20 and the stabilizer bar 12 in order to form welds 42 between the distal ends 34 of the inwardly extending projections 32 and the outer surface 26 of the stabilizer bar 12 by electrical resistance welding, as shown in FIG. 10.

Referring again to FIGS. 1 and 2, a mounting bracket 38 is attached to the bushing retainer 16 to allow the bushing retainer 16 to be mounted to a structural component of the automobile. Preferably, the mounting bracket 38 includes mounting holes 40 that allow the mounting bracket 38 to be attached to the structure of an automobile. With the bushing 18 being made from a resilient material that allows limited movement of the stabilizer bar 12 relative to the bushing retainer 16, the bushing assembly 14 provides a spring rate and dampening of the torsional, radial, and axial movement of the stabilizer bar 12 relative to the structure of the vehicle.

The foregoing discussion discloses and describes various embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A method of mounting a support ring onto a stabilizer bar including;

providing a stabilizer bar;

providing a support ring having a plurality or inwardly extending projections, each of the inwardly extending projections having a distal end;

placing the support ring onto the stabilizer bar such that the inwardly extending projections are in contact with an outer surface of the stabilizer bar;

exerting a radial force against the support ring to force the distal ends of the inwardly extending projections against the outer surface of the stabilizer bar; and passing an electric current through the stabilizer bar and the support ring such that the distal ends of the inwardly extending projections are welded onto the outer surface of the stabilizer bar.

2. The method of claim 1 wherein the support ring is a single piece having an opening at one side, wherein placing the support ring onto the stabilizer bar such that the inwardly extending projections are in contact with an outer surface of the stabilizer bar includes bending the support ring to an open position where the opening is large enough to accommodate the stabilizer bar, placing the support ring about the stabilizer bar, and bending the support ring to bring the distal ends of the inwardly extending projections into contact with the outer surface or the stabilizer bar.

3. The method of claim 1 wherein the support ring comprises a plurality of portions, each of the portions having a plurality of inwardly extending projections having distal ends, wherein placing the support ring onto the stabilizer bar such that the inwardly extending projections are in contact with an outer surface of the stabilizer bar includes placing each of the portions onto the stabilizer bar, spaced circumferentially about the stabilizer bar, such that the distal ends of the inwardly extending projections are in contact with the outer surface of the stabilizer bar.

4. The method of claim 3 wherein placing each of the portions onto the stabilizer bar, spaced circumferentially about the stabilizer bar includes placing each of the portions onto the stabilizer bar such that each of the portions is aligned with one another to provide support for the bushing around the stabilizer bar.

\* \* \* \* \*